(12) United States Patent  
Khadar

(10) Patent No.: US 8,494,335 B2
(45) Date of Patent: Jul. 23, 2013

(54) CABLE RESTRAINT

(75) Inventor: Ahmed Anthony Khadar, Brooklyn Center, MN (US)

(73) Assignee: Calix, Inc., Petaluma, CA (US)

( * ) Notice: Subject to any disclaimer, the term of this patent is extended or adjusted under 35 U.S.C. 154(b) by 284 days.

(21) Appl. No.: 12/892,457

(22) Filed: Sep. 28, 2010

(65) Prior Publication Data

US 2012/0076467 A1    Mar. 29, 2012

(51) Int. Cl.
*G02B 6/00*    (2006.01)

(52) U.S. Cl.
USPC .......................................................... 385/137

(58) Field of Classification Search
USPC ................................................. 385/137, 136
See application file for complete search history.

(56) References Cited

U.S. PATENT DOCUMENTS

| | | | |
|---|---|---|---|
| 4,878,276 A * | 11/1989 | Morrish et al. .................. 24/511 |
| 5,052,085 A * | 10/1991 | Gau .................................. 24/501 |
| 5,134,678 A * | 7/1992 | Essert ............................... 385/86 |
| 5,452,386 A * | 9/1995 | van Woesik ....................... 385/72 |
| 5,463,189 A * | 10/1995 | Deneke et al. ............. 174/138 G |
| 5,464,235 A * | 11/1995 | Goldman et al. ......... 280/11.212 |
| 6,594,433 B2 | 7/2003 | Rosen et al. |
| 6,682,230 B1 * | 1/2004 | Demangone et al. ........... 385/88 |
| 6,768,858 B2 * | 7/2004 | Tinucci et al. ................. 385/134 |
| 6,850,687 B2 * | 2/2005 | Lavoie ........................... 385/137 |
| 6,893,167 B1 | 5/2005 | Brostrom et al. |
| 7,341,386 B2 | 3/2008 | Wu |
| 7,507,034 B2 | 3/2009 | Moore et al. |
| 7,563,035 B2 | 7/2009 | Ice |
| 7,670,063 B2 | 3/2010 | Ice |
| 2002/0131750 A1 * | 9/2002 | Holman et al. ............... 385/136 |
| 2002/0136519 A1 * | 9/2002 | Tinucci et al. ................ 385/134 |
| 2003/0002823 A1 * | 1/2003 | Wu .................................. 385/92 |
| 2004/0054291 A1 * | 3/2004 | Schulz et al. ................. 600/500 |
| 2005/0145522 A1 * | 7/2005 | Bloodworth et al. ......... 206/409 |
| 2005/0254767 A1 * | 11/2005 | Chun ............................ 385/136 |
| 2006/0002134 A1 * | 1/2006 | Capriola ....................... 362/570 |
| 2006/0056779 A1 * | 3/2006 | Wang .............................. 385/92 |
| 2009/0069060 A1 * | 3/2009 | Kim ........................... 455/575.6 |

OTHER PUBLICATIONS

U.S. Appl. No. 12/860,211, filed Aug. 20, 2010, entitled "Optical Transceiver Assembly".

* cited by examiner

*Primary Examiner* — Kaveh Kianni

(74) *Attorney, Agent, or Firm* — Shumaker & Sieffert, P.A.

(57) ABSTRACT

Techniques are disclosed that restrain cables in order to relieve excessive tensile force and to prevent breakage at a point of termination. In one example, a system includes a clip and a receiver configured to receive the clip. The clip includes a first member and a second member pivotally connected to each other by a hinge, the hinge located intermediate opposed ends of the first member and the second member, the hinge defining a groove for receiving a first portion of the cable.

12 Claims, 7 Drawing Sheets

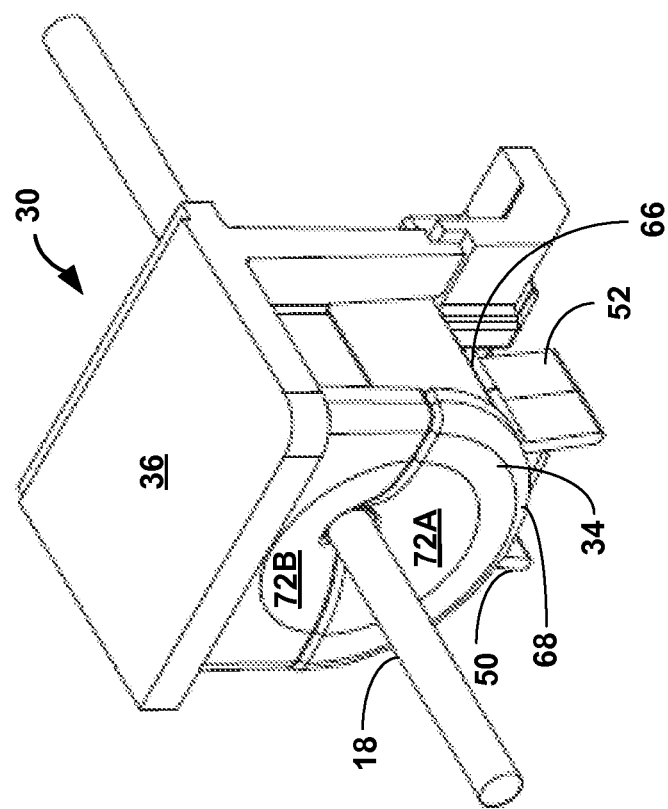
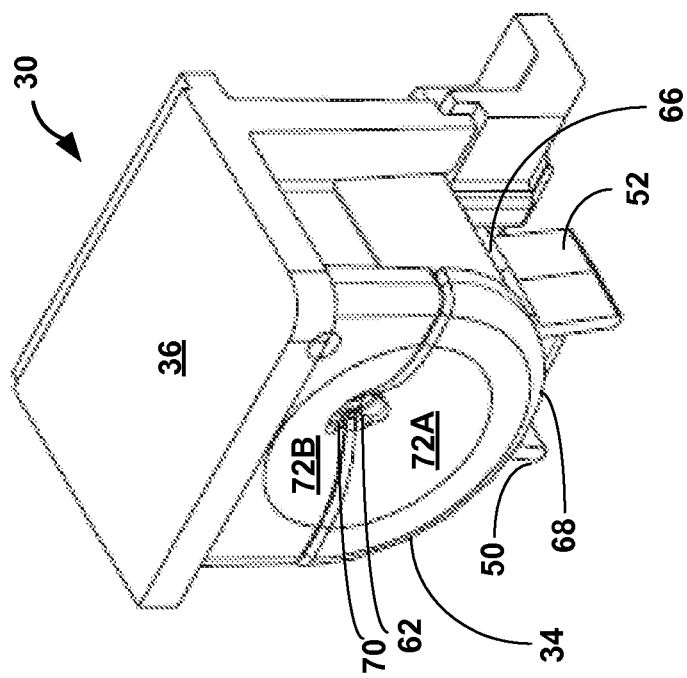
FIG. 3B
FIG. 3A

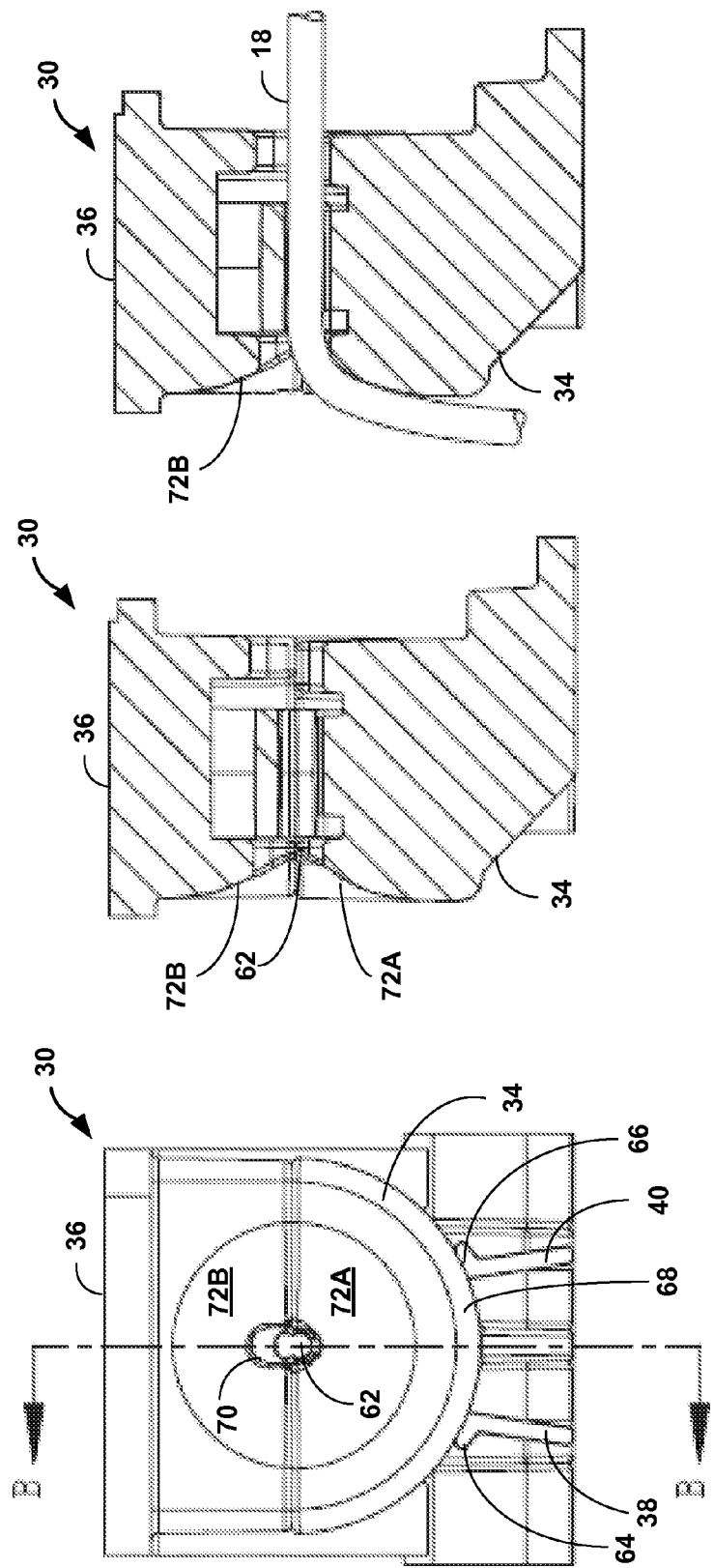

CABLE RESTRAINT

TECHNICAL FIELD

This disclosure relates to cable restraints and, more particularly, to cable restraints for electronic devices.

BACKGROUND

In many electronic devices, it is desirable to restrain electrical wires, coaxial cables, optical fiber cables, or other signal-carrying elements in order to reduce movement, reduce or eliminate excessive tensile stress, and/or secure the signal-carrying element in a specific configuration within the electronics device. As an example, it may be desirable to restrain optical fiber cable attached to an optics transceiver, e.g., optical diplexer or optical triplexer, in order to relieve the optical fiber of excessive tensile stress and to prevent breakage at the transceiver, i.e., a point of termination.

In addition, many signal-carrying elements, e.g., wire and optical fiber, have a minimum bend radius beyond which the element should not be bent to prevent signal degradation and/or damage to the signal-carrying element. The minimum bend radius is of particular importance to optical fiber cable, due to the material of the fiber, e.g., glass, and the principle of total internal reflection that is relied upon for signal transmission.

SUMMARY

In general, this disclosure describes techniques for restraining a cable exiting an electronics device. In some cases, a clip used to grip the cable exiting the device and a receiver is used to secure the clip, thereby restraining the cable. The receiver may be configured to ensure that the cable's minimum bend radius is maintained.

In one example, the disclosure is directed to a system for restraining a cable. The system comprises a clip comprising a first member and a second member pivotally connected to each other by a hinge, the hinge located intermediate opposed ends of the first member and the second member, the hinge defining a groove for receiving a first portion of the cable, and a receiver configured to receive the clip.

In another example, the disclosure is directed to a method that comprises inserting a portion of a cable into a groove defined by a hinge of a clip, wherein the clip comprises a first member and a second member pivotally connected to each other by a hinge, the hinge located intermediate opposed ends of the first member and the second member, the hinge defining a groove for receiving a first portion of the cable, and inserting the clip into a receiver The details of one or more aspects of the disclosure are set forth in the accompanying drawings and the description below. Other features, objects, and advantages will be apparent from the description and drawings, and from the claims.

BRIEF DESCRIPTION OF DRAWINGS

FIGS. 3A and 3B are perspective, assembled views of the example system depicted in FIG. 2.

FIG. 4A is a front view of the example system depicted in FIG. 3A.

FIGS. 4B and 4C are cross-sectional views taken along line B-B of FIG. 4A, from opposite sides, depicting a bell-shaped curvature of the example system of FIG. 3A.

DETAILED DESCRIPTION

This disclosure describes techniques for restraining cables, e.g., optical fiber cable. In some examples, the techniques may be effective in relieving or preventing application of excessive tensile force, or proof stress, and preventing breakage at a point of termination. In implementations in which a cable is exposed and accessible outside of the housing of an electronic device, the cable should be restrained at or near a point of entry into the housing. If the cable is not adequately restrained, an accidental or intentional pull on the cable could permanently stress, damage or break the cable, or result in a bend that exceeds the minimum bend radius of the cable.

Many existing optical fiber strain reliefs are either over-molded or glued onto the outer jacket of the optical fiber. In either case, when the fiber is subjected to tensile force, or proof stress, the optical fiber is primarily protected by the strength member(s) enclosed within the outer jacket. However, in cases where the strength members are not attached at both ends of the cable, e.g., the strength members at one end of an optical fiber pigtail are not attached to a ferrule, the aforementioned existing strain reliefs may not protect the optical fiber. In accordance with some example techniques of this disclosure, a cable, e.g., an optical fiber cable, restraint is disclosed that can provide adequate strain relief up to the allowable proof stress that the cable can withstand, even in implementations where the strength members are not attached at both ends of the cable. In some examples, the cable restraint may be easily installed or removed (and thus reused) without needing tools, adhesive, or special training. In addition, the cable restraint may be suitable for use with small diameter cables, e.g., optical fibers with diameters of about 2 millimeters, as well as larger diameter cables.

Figure 1:
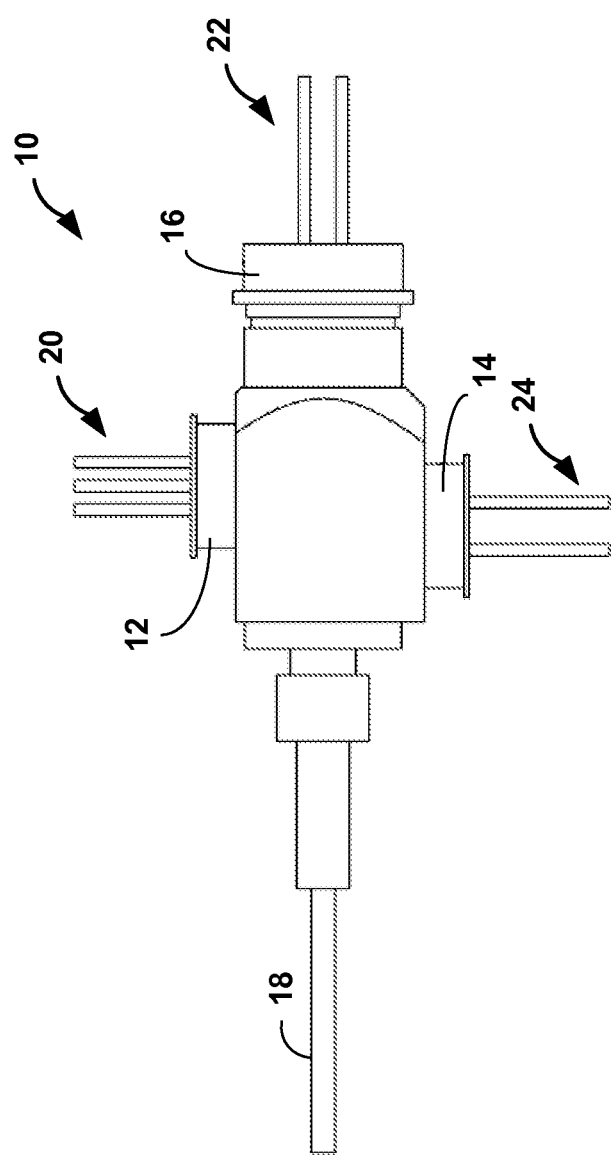
FIG. 1 is a top view of an example optical transceiver module.

FIG. 1 is a top view of an optical transceiver module 10 and optical fiber cable 18. Optical transceiver module 10 may take the form, e.g., of an optical diplexer, an optical triplexer, or the like. As shown in FIG. 1, optical transceiver module 10 includes digital receiver 12, analog receiver 14, and transmitter 16 for receiving and transmitting light pulses via optical fiber cable 18. It should be noted that an optical fiber cable is a cable containing one or more optical fibers surrounded by a protective jacket or sheath. As seen in FIG. 1, each of digital receiver 12, analog receiver 14, and transmitter 16 comprises a plurality of electrically conductive leads, shown generally in the example of FIG. 5 as leads 20, 22, and 24, respectively. In some example implementations, optical transceiver module 10 and, in particular, leads 20, 22, and 24, are soldered to pads on a printed circuit board that forms a portion of an electronic device, e.g., an optical network device.

Using the techniques of this disclosure, optical fiber cable 18, for example, may be restrained to prevent damage to cable 18 and/or optical transceiver module 10. For example, without a cable restraining system to restrain optical fiber cable 18, as described in this disclosure, a force applied to cable 18 may pull cable 18 at least partially out of module 18, thereby affecting signal integrity, damaging cable 18, and/or damaging optical transceiver module 10. However, in accordance with this disclosure, a clip and receiver system may restrain cable 18, thereby relieving cable 18 of excessive tensile stress and preventing a force applied to cable 18 from being transmitted to optical transceiver module 10, for example.

Figure 2:
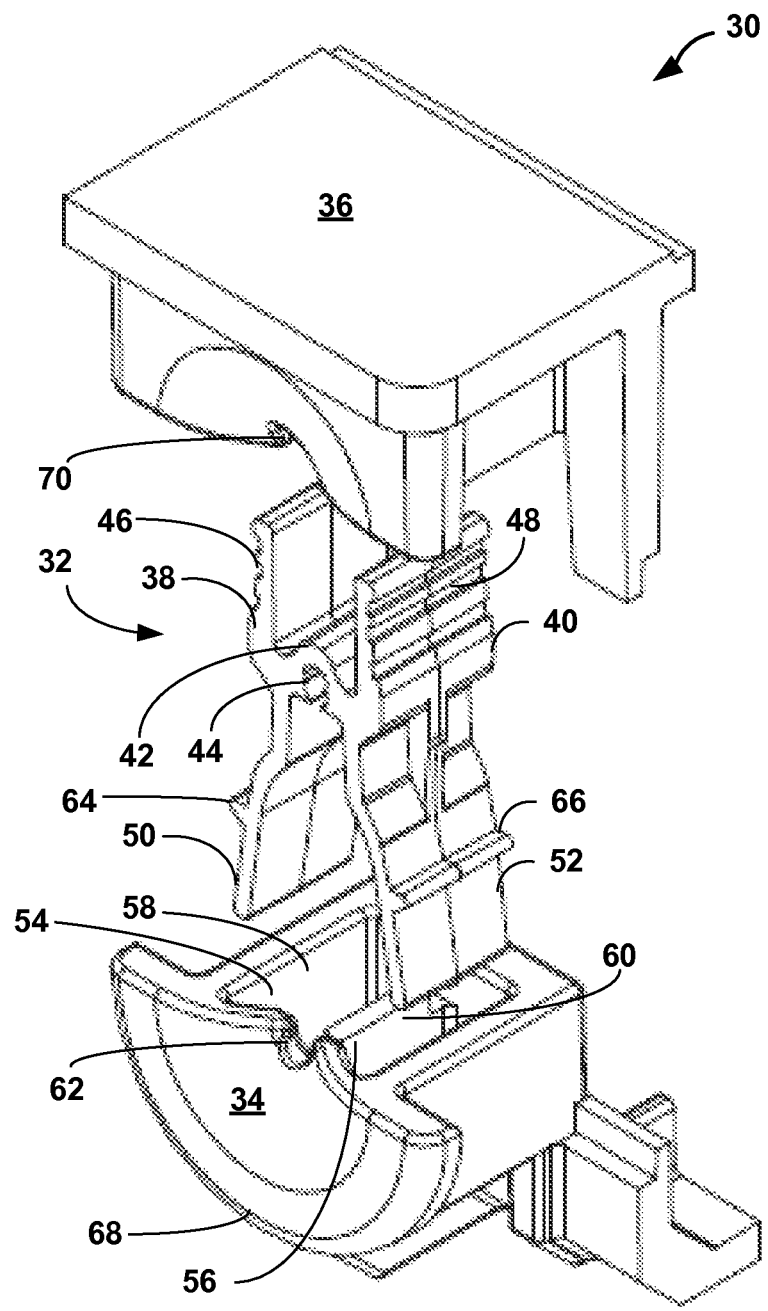
FIG. 2 is an exploded view of an example system for restraining a cable, in accordance with an example of this disclosure.

FIG. 2 is an exploded view of example system 30 for restraining a cable, in accordance with this disclosure. System 30 includes clip 32 and receiver 34. In some configurations, system 30 may include cover 36, which joins receiver 34 to at least partially cover clip 32.

Clip 32 includes first member 38 and second member 40, which are pivotally connected to each other by hinge 42. Hinge 42 is located intermediate opposed ends of first member 38 and second member 40. Hinge 42 defines groove 44 for receiving a portion of a cable, e.g., optical fiber cable 18 of FIG. 1. As shown and described in more detail below with respect to FIG. 5, pressure applied to ends 46, 48 of first member 38 and second member 40, respectively, cause opposing ends 50, 52 of first member 38 and second member 40, respectively, to flex outwardly away from one another, which in turn causes groove 44 to open. Upon groove 44 opening, a portion of a cable, e.g., optical fiber cable 18 of FIG. 1, may be inserted into groove 44.

After groove 44 receives a portion of the cable, the pressure applied to ends 46, 48 of first member 38 and second member 40, respectively, may be removed. As the pressure is removed, opposing ends 50, 52 of first member 38 and second member 40 pivot toward each other about hinge 42, thereby enclosing the received portion of the cable to clip 44 within groove 44.

As seen in FIG. 2, opposing ends 46, 48 of first member 38 and second member 40 may be substantially straight and include ridges to stiffen the top portion of clip 32. Opposing ends 50, 52 of the bottom portion of clip 32 may be constructed to be more flexible then ends 46, 48, e.g., by providing thinner material than that of ends 46, 48 and/or not including ridges, and also flare outward. The stiff, straight top portion of clip 32 combined with the flexible bottom portion of clip 32 ensure that that the grip on the cable received by groove 44 is not relaxed when the ends 50, 52 are inserted into receiver 34.

Following insertion of the portion of cable into groove 44, clip 32 is inserted into receiver 34. As seen in FIG. 2, receiver 34 defines aperture 54, which is configured to receive clip 32 and, in particular, first member 38 and second member 40 of clip 32. In some examples, aperture 54 extends completely through receiver 34 so that at least a portion of first member 38 and second member 40 of clip 32 extend outwardly from a bottom of receiver 34.

As clip 32 is inserted into aperture 54 of receiver 34, pressure is applied to opposing ends 50, 52 of first member 38 and second member 40. The pressure forces opposing ends 50, 52 toward one another, which causes groove 44 to close about the outer jacket of the received portion of the cable. In this manner, the received portion of the cable is secured by system 30, thereby reducing the possibility that the cable may be inadvertently or deliberately pulled out of a connecting device, e.g., optical transceiver module 10 of FIG. 1 or subjected to proof stress, i.e., the stress at which a material begins to deform. For example, in implementations in which the cable, e.g., optical fiber cable, is exposed and/or accessible outside the housing of the electronic device, e.g., an optical network device, system 30 restrains the cable at the point of entry into the housing, thereby preventing the cable from being pulled out and providing sufficient strain relief up to the allowable proof stress that the cable can withstand. For example, in some configurations of system 30, about seven pounds of force can be applied to optical fiber without pulling it out of housing or damaging the fiber.

In some example configurations, receiver 34 includes dividing member 56 that divides aperture 54 into first aperture 58 and second aperture 60. First aperture 58 in configured to receive first member 38 and second aperture 60 is configured to receive second member 40.

As seen in FIG. 2, receiver 34 defines second groove 62 for receiving a second portion of the cable, e.g., optical fiber cable 18 of FIG. 1, upon receiver 34 receiving clip 32. Receiver 34 further defines a third groove (not shown in FIG. 2) substantially opposite groove 62 for receiving a third portion of the cable upon receiver 34 receiving clip 32. The second and third grooves allow the cable to be seated on receiver 34 as the cable transitions from inside a housing of an electronics device, e.g., an optical network device, to outside the housing, without pinching the cable or other imparting forces that might stress the cable.

In other example configurations, first member 38 and second member 40 may include first protrusion 64 and second protrusion 66, respectively, for securing against removing clip 32 upward from receiver 34. In particular, as clip 32 is pushed downward into aperture 54 of receiver 34, protrusions 64, 66 are forced through aperture 54 until they exit aperture 54 at bottom 68 of receiver 34. As protrusions 64, 66 exit aperture 54 of receiver 34, protrusions 64, 66 catch against bottom 68 of receiver 34, thereby preventing clip 32 from being inadvertently pulled out of receiver 34.

In order to remove clip 32 from receiver 34, pressure may be first applied to ends 50, 52 of first member 38 and second member 40, respectively, in order to push ends 50, 52 toward one another. Pressure may then be applied in an upward direction in order to push clip 32 out of receiver 34. In this manner, clip 32 may be easily secured within and then later removed from receiver 34.

As indicated above, in one implementation, system 30 may also include cover 36. In some implementations, cover 36 may form part of a larger housing that covers an electronics device. Cover 36 may cover a top portion of clip 38, including ends 46, 48, thereby protecting clip 38 from inadvertent damaged or removal from receiver 34. Cover 36 may also define groove 70 that, like groove 62 of receiver 34, allows the cable, e.g., optical fiber cable 18 of FIG. 1, to transition from inside a housing to outside the housing without pinching the cable or otherwise imparting forces that might stress the cable. Cover 36 may define another groove (not shown) substantially opposite groove 70.

FIGS. 3A and 3B are perspective, assembled views of the example system depicted in FIG. 2. In FIG. 3A, clip 32 of FIG. 2 has been fully inserted into receiver 34. In particular, opposing ends 50, 52 of first member 38 and second member 40, respectively, extend through aperture 54 (not shown in FIG. 3A) and past bottom 68 of receiver 34. As depicted in FIG. 3A, in some example implementations, first protrusion 64 and second protrusion 66 of first member 38 and second member 40, respectively, have been forced through aperture 54 (not shown in FIG. 3A) until they exit aperture 54 at bottom 68 of receiver 34. Protrusions 64, 66 catch against bottom 68 of receiver 34, thereby preventing clip 32 from being inadvertently pulled out of receiver 34. FIG. 3B depicts cable 18, e.g., an optic fiber cable, secured by system 30 of FIG. 3A.

In accordance with this disclosure, strain relief system 30 may also define a bell shape in order to reduce or eliminate the possibility that a cable, e.g., optical fiber cable 18 of FIG. 1, is bent beyond its minimum bend radius. In FIG. 3A, the bell shape is created by both receiver 34 and cover 36 and, in particular, surfaces 72A and 72B, shown and described in more detail below with respect to FIGS. 4B and 4C. It should be noted, however, that in implementations in which system 30 does not include cover 36, surface 72A of receiver 34 may be sufficient to reduce or eliminate the possibility that a cable is bent beyond its minimum bend radius. In addition, it should be noted that there is no limit to the minimum bend radius that strain relief system 30 can be support. The bell-shaped curvature of system 30 can be modified to meet the requirements of the particular diameter of fiber used.

Strain relief system 30 may be designed to accommodate cables of various diameters. For example, strain relief system 30 may be designed to accommodate optical fiber cable having diameters of 2 millimeters (mm), 3 mm, or some other diameter. In some examples, strain relief system 30 may allow a cable, e.g., optical fiber cable, to be subjected to a tensile stress of about 200 kilo pounds per square inch (kpsi). In some examples, strain relief system 30 may be made of plastic, e.g., Valox 3706, in order to make system easier to mold.

FIG. 4A is a front view of the example system depicted in FIG. 3A. In FIG. 4A, clip 32 (not shown in FIG. 4A) has been fully inserted into receiver 34. FIG. 4A depicts first protrusion 64 and second protrusion 66 of first member 38 and second member 40, respectively, extending through and exiting aperture 54 (not shown) at bottom 68 of receiver 34, thereby preventing clip 32 from being inadvertently pulled out of receiver 34.

FIGS. 4B and 4C are cross-sectional views taken along line B-B of FIG. 4A, depicting the bell-shaped curvature of the example system of FIG. 3A. As mentioned above, a minimum bend radius is a radius beyond which a signal-carrying element, e.g., an optical fiber or wire conductor, should not be bent in order to prevent signal degradation and/or damage to the element. The minimum bend radius is of particular importance to optical fiber cable, due to the material of the fiber, e.g., glass, and the principle of total internal reflection that is relied upon for signal transmission. In accordance with this disclosure, in one example configuration, surfaces 72A and 72B of receiver 34 and cover 36, respectively, may combine to form a bell shape that reduces or eliminates the possibility that a cable exiting system 30 may be bent beyond its minimum bend radius. In example configurations in which cover 36 is not used, surface 72A alone may be sufficient to ensure that the minimum bend radius is maintained.

As seen in FIG. 4B, receiver 34 and cover 36 define surfaces 72A and 72B, respectively, such that each of surfaces 72A, 72B is slightly curved. The curvature of surfaces 72A, 72B permits a cable to be secured in a configuration such that the cable, exiting groove 62, may lie against either surface 72A or 72B and maintain its minimum bend radius. For instance, a cable horizontally exiting groove 62 may transition to a vertical configuration without stressing the cable beyond the cable's minimum bend radius. FIG. 4C depicts cable 18, e.g., an optical fiber cable, lying against surface 72A (not labeled in FIG. 4C for clarity) and maintaining its minimum bend radius due to the curvature of surface 72A.

Different types of cable may each have different minimum bend radii. For example, the minimum bend radius of a Category 5 (CAT-5) cable may be different than that of an optical fiber cable, and both may be different than the minimum bend radius of a Universal Serial Bus (USB) cable. The minimum bend radius of a cable is often specified by the manufacturer as a function of the cable's outer diameter. In accordance with this disclosure, system 30 and, in particular, surface 72A (and, in some configurations, surface 72B) may define a curvature suitable for a specific minimum bend radius. For example, system 30 may be configured such that surface 72A defines a curvature that is suitable for a minimum bend radius of one inch. In this manner, different cable restraint systems 30 may be constructed that are suited to a particular type of cable, a particular dimension of cable, e.g., outer diameter, or both. For example, one system may be constructed to be used with optical fiber cable with a minimum bend radius of one inch while another system may be constructed to be used with a USB cable with a minimum bend radius of three inches.

Figure 5:
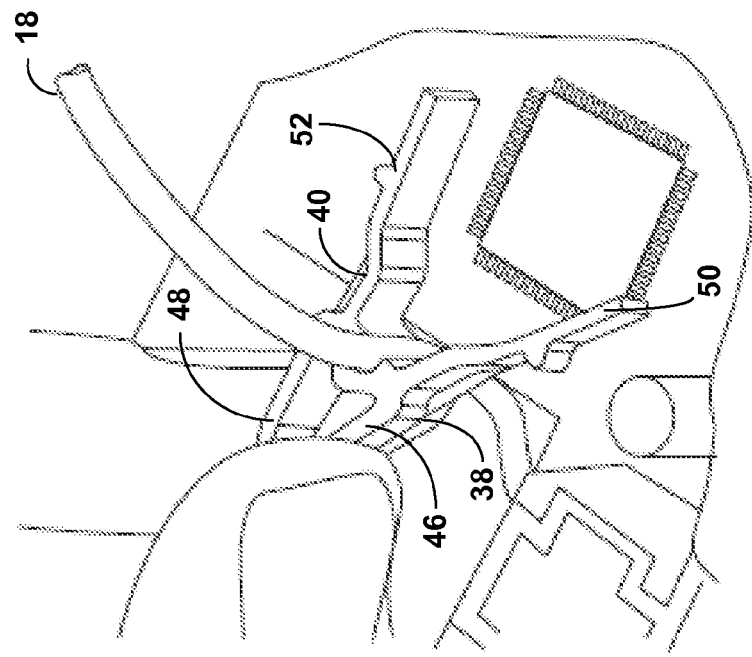
FIG. 5 is a schematic view of a clip installed on a cable, in accordance with certain example techniques of this disclosure.

FIG. 5 is a schematic view of a clip installed on a cable, in accordance with certain techniques of this disclosure. Manually pinching or otherwise exerting pressure (e.g., with thumb and forefinger) on ends 46, 48 of first member 38 and second member 40, respectively, causes opposing ends 50, 52 of first member 38 and second member 40, respectively, to flex outwardly away from one another, which in turn causes groove 44 of FIG. 1 to open. Once groove 44 has opened, groove 44 may receive a portion of a cable, e.g., optical fiber cable 18 of FIG. 1.

Figure 6:
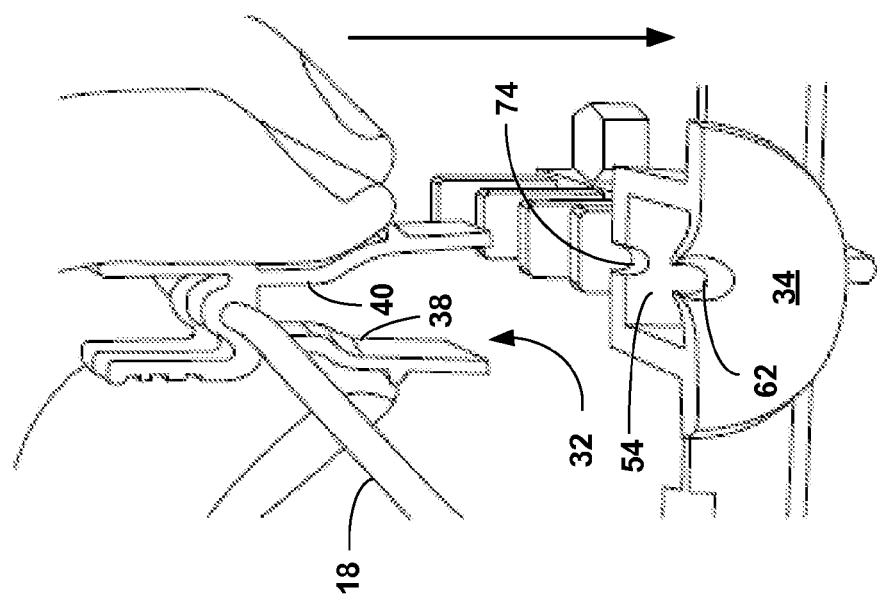
FIG. 6 is a schematic view of the clip of FIG. 5 in condition for insertion into a receiver, in accordance with certain techniques of this disclosure.

FIG. 6 is a schematic view of the clip of FIG. 5 ready for insertion into receiver 34, in accordance with certain techniques of this disclosure. As seen in FIG. 6, upon receiving cable 18, first member 38 and second member 40 of clip 32 may be directed downward into aperture 54 of receiver 34. In this manner, second groove 62 and third groove 74 receive second and third portions of cable 18. It should be noted that, in some examples, receiver 34 might be mounted, e.g., on a circuit board, at or near an exit or outer wall of an enclosure. The location of receiver 34 relative to the circuit board should be such that adequate room for cable management is provided, e.g., enough room for assembly and minimum bend radius. Receiver 34 may limit access to clip 32 so that clip 32 cannot be removed without opening the enclosure.

Figure 7:
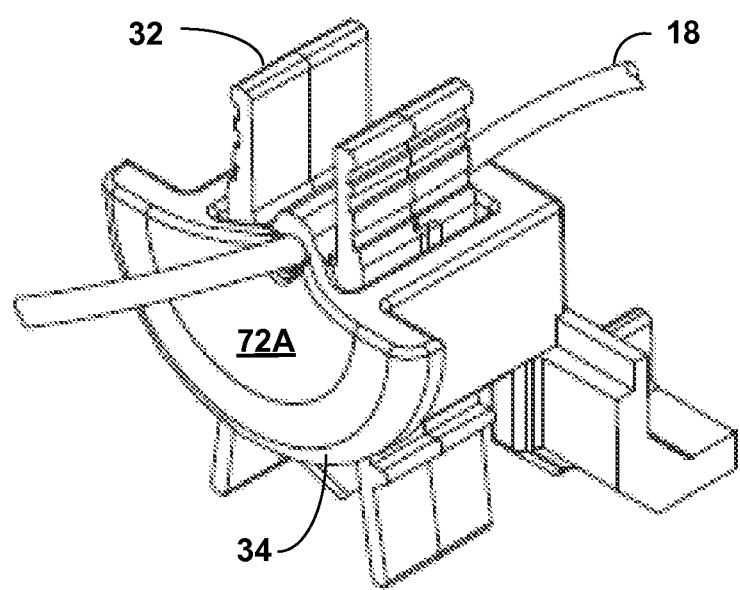
FIG. 7 is a schematic view of the clip and receiver of FIG. 6 with the cable installed.

FIG. 7 is a schematic view of the clip and receiver of FIG. 6 installed. As described above, second groove 62 and third groove 74 receive second and third portions of cable 18, thereby allowing cable 18 to be seated on receiver 34 as the cable transitions from inside a housing to outside the housing without pinching the cable or other imparting forces that might stress the cable. Using the techniques of this disclosure, clip 32 grabs onto the outside of the jacket of cable 18 with sufficient force to secure cable 18 without damaging the signal carrying elements of cable 18. For example, optical fiber cables generally include a protective cover, or jacket, the optical fibers used for carrying signals, and strength members, e.g., Aramid fibers such as Kevlar®. Clip 32 may grab onto the outside of the jacket of the optical fiber cable, for example, and use the inter-cable forces imparted by the strength members onto the optical fibers to grab and hold the optical fibers, thereby providing sufficient strain relief up to the allowable proof stress that the optical fibers can withstand.

Figure 8:
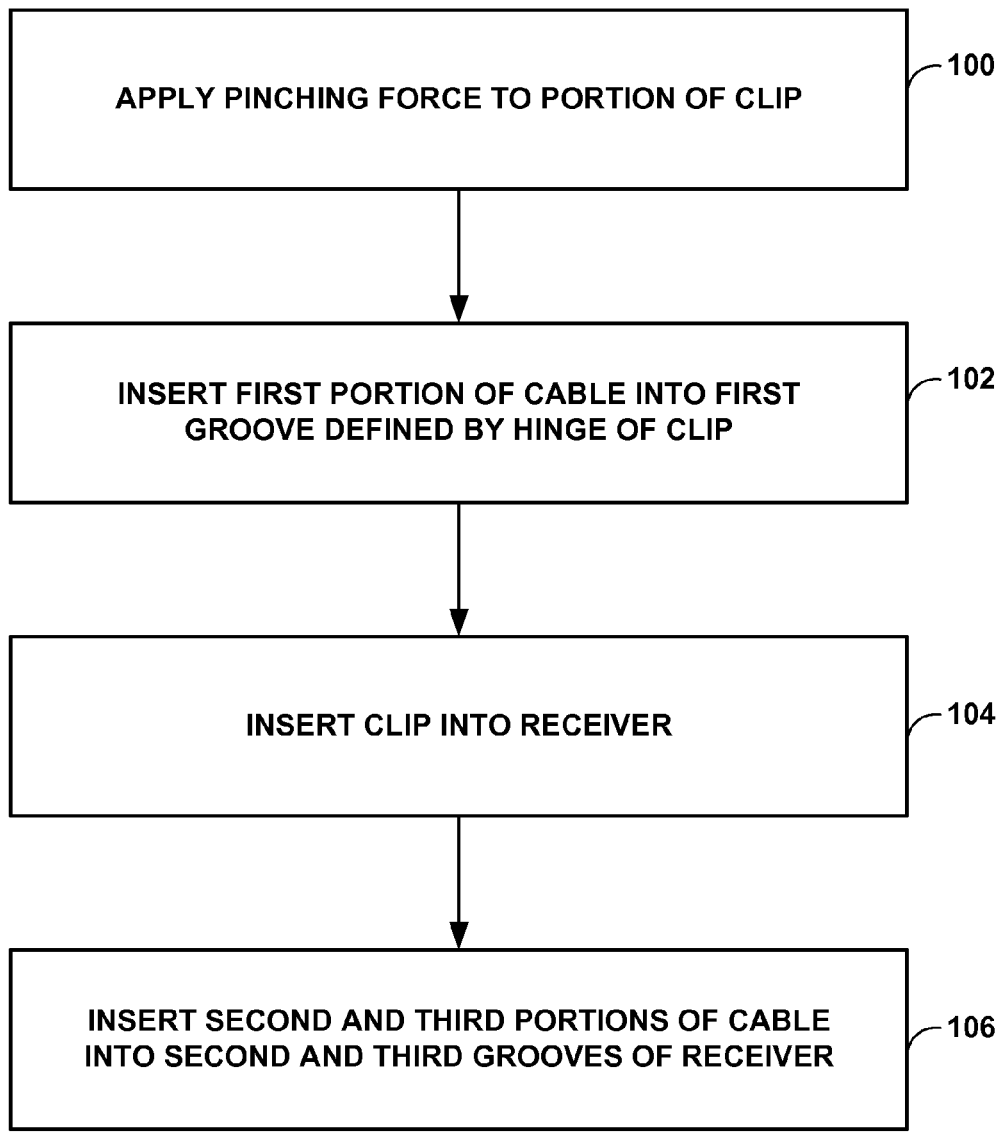
FIG. 8 depicts a flow chart of an example method of restraining a cable, in accordance with certain techniques of this disclosure.

FIG. 8 depicts a flow chart of an example method of restraining a cable, in accordance with certain techniques of this disclosure. In the method depicted in FIG. 8, a force is applied to a portion of the clip (100). For example, a pinching force may be applied to opposing ends 38, 40 of a top portion of clip 32, thereby opening groove 44 to receive a first portion of a cable. The first portion of the cable is then inserted into groove 44 defined by hinge 42 of clip 32 (102). Clip 32 is inserted into an aperture defined by receiver 34 (104) and second and third portions of the cable are inserted into second and third grooves defined by receiver 34 (106).

As mentioned above, in some configurations, system 30 includes a cover. In such cases, the method may further include joining cover 36 and receiver 34 to at least partially enclose clip 32. Clip 32 may also include protrusions 64, 66, as described above. In such implementations, the method may further include applying a force to clip 32 until protrusions 64, 66 exit aperture 54 at bottom 68 of receiver 34, thereby preventing clip 32 from being inadvertently pulled out of receiver 34.

Various examples of the disclosure have been described. These and other examples are within the scope of the following claims.

The invention claimed is:

1. A system for restraining a cable, the system comprising:
   a clip comprising a first member and a second member pivotally connected to each other by a hinge, the hinge located intermediate opposed ends of the first member and the second member, the hinge defining a groove for receiving a first portion of the cable; and
   a receiver configured to receive the clip, wherein the receiver includes a surface defining a curvature, and wherein the curvature of the surface is configured to ensure that, upon engagement of the cable with the surface, a minimum bend radius of the cable is not exceeded.

2. The system of claim 1, wherein the first member defines a first protrusion and the second member defines a second protrusion, and wherein the first protrusion and the second protrusion secure against removing the clip upward from the receiver.

3. The system of claim 1, further comprising:
   a cover that joins the receiver to at least partially enclose the clip.

4. The system of claim 3, wherein the groove defined by the hinge is a first groove, and wherein the receiver defines a second groove and a third groove for receiving a second portion and a third portion of the cable, respectively.

5. The system of claim 3, wherein the receiver defines an aperture, and wherein the aperture is configured to receive the first member and the second member.

6. The system of claim 5, wherein the receiver comprises a dividing member that divides the aperture into a first aperture and a second aperture, and wherein the first aperture receives the first member and the second aperture receives the second member.

7. The system of claim 1, wherein the cable is an optical fiber cable.

8. A method comprising:
   inserting a portion of a cable into a groove defined by a hinge of a clip, wherein the clip comprises a first member and a second member pivotally connected to each other by the hinge, the hinge located at intermediate opposed ends of the first member and the second member, the hinge defining the groove for receiving the portion of the cable; and
   inserting the clip into a receiver, wherein the receiver includes a surface defining a curvature, and wherein the curvature of the surface ensures that, upon engagement of the cable with the surface, a minimum bend radius of the cable is not exceeded.

9. The method of claim 8, wherein the portion is a first portion, wherein the groove is a first groove, and wherein inserting the clip into the receiver further comprises:
   inserting a second portion of the cable into a second groove defined by the receiver and a third portion of the cable into a third groove defined by the receiver.

10. The method of claim 8, wherein inserting the clip into the receiver comprises:
    inserting the first member and the second member into an aperture defined by the receiver.

11. The method of claim 10, wherein the receiver comprises a dividing member that divides the aperture into a first aperture and a second aperture, and wherein inserting the first member and the second member into the aperture defined by the receiver comprises:
    inserting the first member into the first aperture and the second member into the second aperture.

12. The method of claim 8, further comprising:
    joining a cover and the receiver to at least partially enclose the clip.

* * * * *